Nov. 8, 1949 R. SAULNIER 2,487,598
RETRACTABLE LANDING GEAR
Filed June 29, 1946 3 Sheets-Sheet 3
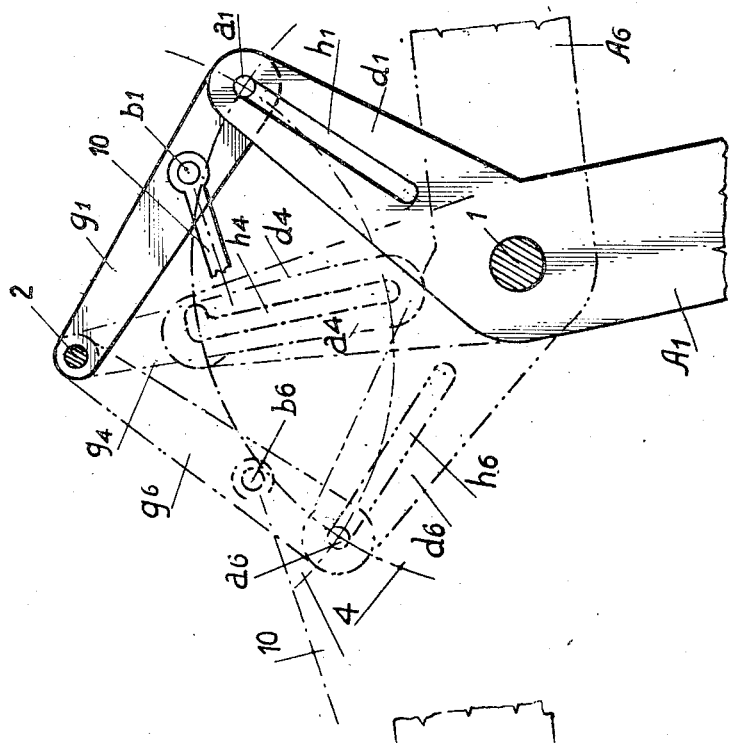
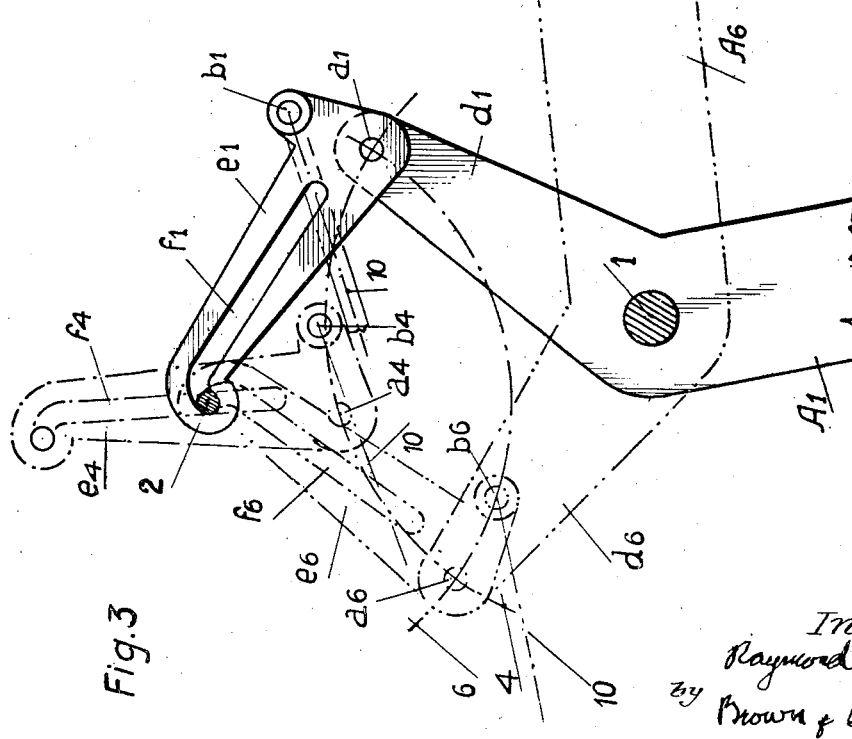
Inventor:
Raymond Saulnier
by Brown & Seward
Attorneys Patented Nov. 8, 1949

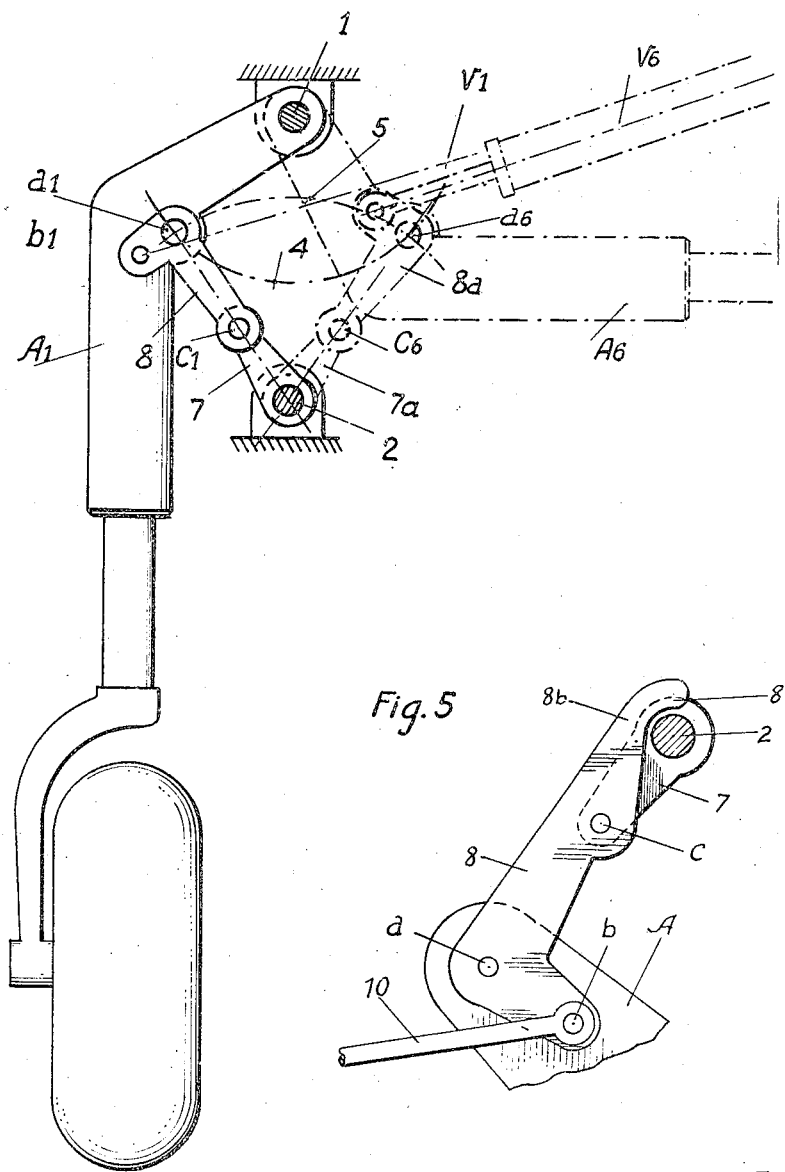

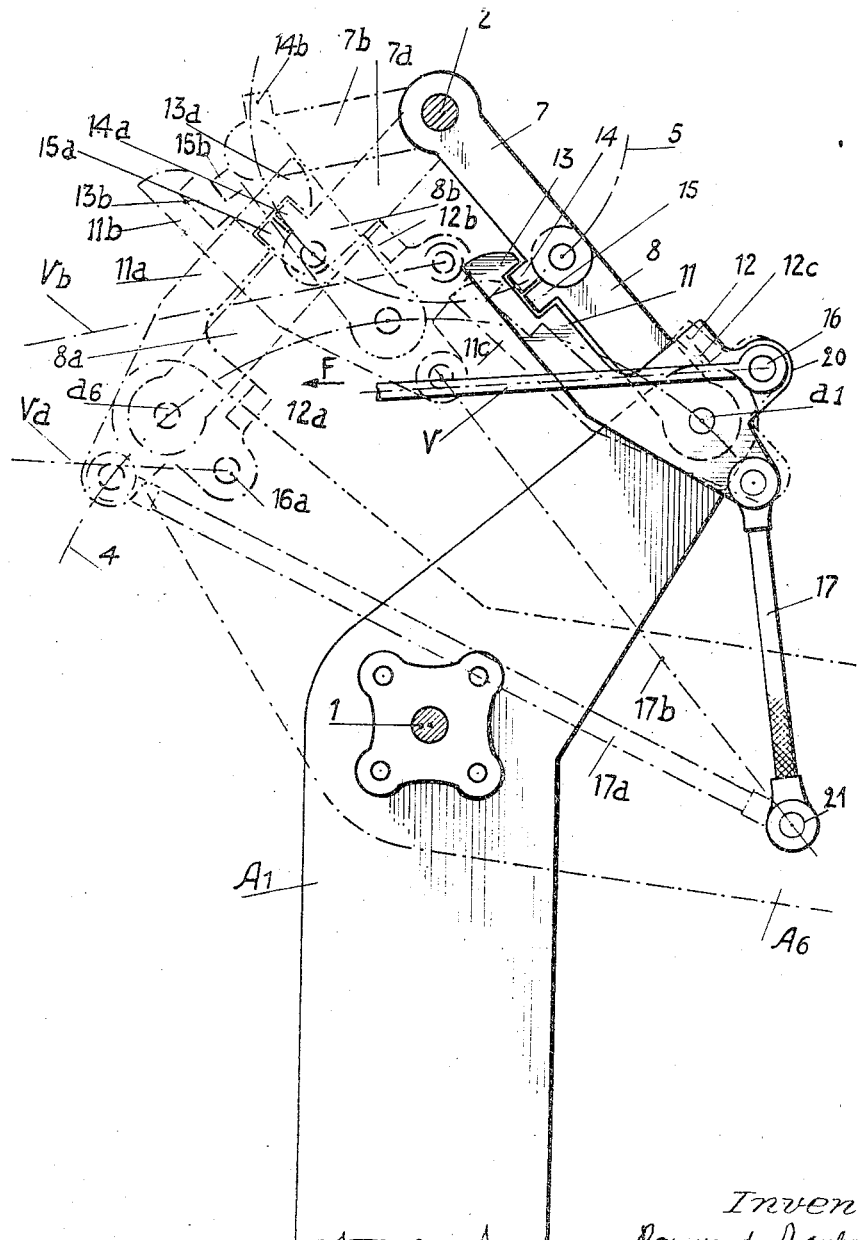

2,487,598

UNITED STATES PATENT OFFICE 2,487,598

RETRACTABLE LANDING GEAR

Raymond Saulnier, Paris, France

Application June 29, 1946, Serial No. 680,401
In the Netherlands April 26, 1946

4 Claims. (Cl. 244—102)

The invention deals with retractable landing gears for aircraft and aims at simplifying the operation between the retracted and landing position of the gear while making certain that it is locked as well in the landing position as in the retracted position.

The gear is composed of a wheel-carrying leg hinged at a suitable point of its length to a pivot rigid with the aircraft, of a locking member joined on the one hand to an axis also rigid with the aircraft and on the other hand to the leg at a certain distance from the pivot connecting the leg with the aircraft and of a control device such as a jack, connected on the one hand to a pivot rigid with the aircraft and on the other hand to a pivot rigid with the locking member.

With such an arrangement, if a straight line is imagined as going through the pivots connecting the aircraft respectively with the leg and with the locking member, the part of the leg located between its pivot of connection with the aircraft and its pivot of connection with the locking member on the one hand and the said locking member on the other hand form with the straight line above mentioned, as well in the retracted position as in the landing position, two triangles of which this straight line forms the base, these two triangles being thus equal and symmetrical in relation to the said pivot. In the two symmetrical positions, the locking member serves to stay the triangle, thus ensuring the locking of the wheel-carrying leg in its two extreme positions, while in all the intermediary positions the side of the triangle formed by the locking member or the side constituted by the distance between the pivots of connection of the leg decreases in length, and its other two sides keep the same length. The jack that acts directly on the locking member, being connected on the one hand to an axis fixed in relation to the aircraft and on the other hand to the said locking member, initiates at the start of its run the unlocking of the gear by cutting out the staying effect, then the receding movement or the dropping of the leg and finally the locking in the other extreme position, while restoring the staying effect.

It must be understood that the locking member can assume any desired shape without departing on that account from the principle of my invention.

According to one method of execution the locking member is formed by a folding link consisting of two branches hinged together.

In accordance with another method of execution, this member is made up of a rigid bar forming a link which engages either the pivot or axis rigid with the aircraft or the pivot or axis carried by the leg, while this link includes preferably at its outer end a terminal part set back in relation to the longitudinal axis of the link for engaging the pivot or axis of the corresponding connection in gear locking position.

In accordance with a third method of execution, the locking member, in contradistinction with the first mentioned two forms of execution, has a fixed length while the pivot or axis connecting it with the leg, is on the other hand slidingly movable, for instance, in a link cut in this leg. Thus, according to this third method of execution, the side of the triangle of varying length, is formed by the distance between the pivot or axis of connection between the aircraft and the leg and the pivot connecting said leg with the locking member.

In the case of employment of a folding link as a locking member, provision has been made according to a different way of carrying out the invention, of improving the system by a mechanism that ensures the abutment of the folding link in its two extreme positions, said mechanism including on the two elements of the folding link shoulder-pieces bearing one against the other in the locking position, so as to stay the link while a movable catch engages the two shoulder-pieces mentioned above at the end of the run, so as to ensure a positive locking in the landing position. In this example, the jack acts for preference on the complementary movable catch just mentioned, so as to ensure at the start of the run the unlocking of the gear, after which this catch transmits the effort of the jack to one of the branches of the folding link to ensure the turning of the wheel-carrying leg.

The connecting point of the leg with reference to the aircraft can be situated as has been said above, at any point of its length more or less removed from its upper end and even it may coincide with this latter end.

Lastly, the control member of the retracting or of the landing position of the gear can be arranged in any suitable way and consist of any appropriate means, a jack for instance and especially a hydraulic or a pneumatic jack.

The present invention will be better understood with the help of the attached drawings on which are shown as examples some ways of carrying out my invention.

In said drawings:

Fig. 1 is a diagrammatic view of a form of execution of a gear in accordance with the invention.

Fig. 2 shows, also in elevational view, a form of execution including a complementary locking device.

Fig. 3 shows a gear in accordance with the invention the locking member of which is composed of a bar forming a link.

Fig. 4 illustrates a gear in which the locking member is hinged to the leg by an axis movable in relation thereto.

Fig. 5 shows a constructional detail.

Referring first of all to Fig. 1, the wheel-carrying leg A is hinged through its upper offset end to a pivot 1 fixed with reference to the aircraft. The locking member, consisting in this case of a folding link made up of two branches 7 and 8 hinged together by the pivot C is pivotally connected at one of its ends to a pivot or axis 2 fixed with reference to the aircraft, and at its other end to a pivot or axis $a$ carried at an intermediate point of the leg A.

The wheel-carrying leg is shown in fully-drawn lines as well as the folding link in its retracted position. In this example, the hinge-point $a$ between the leg and link describes an arc of a circle around the pivot 1 and the two positions of symmetry are at the intersections of this arc, shown at 4 with an arc shown at 5, and described around the pivot 2 with a radius equal to the distance between the pivots 2 and $a$ when the folding link 7—8 is at its maximum length. In this example the jack V adapted to rock round a pivot fixed with reference to the aircraft, is pivotally secured to the folding link through a pivot $b$ set back in relation to the line $a$—2 in such a way as to produce around the point $a$ a torque ensuring at the beginning of the run the unlocking and at the end of the run, the locking of the gear.

It is easy to understand that the exact shape of the end of the elastic leg, the position of the pivots of connection with the aircraft, etc., can vary within a wide range without on that account departing from the principle of the invention.

In the foregoing example, the locking in the two outside positions of the wheel-carrying leg is ensured simply by the alignment of the two branches of the folding link. In order to improve the locking, the folding link can be made as shown in Fig. 5. In this example, the branch 8 has an extension formed by a part 8b that carries a nose 8c. In the positions of the leg corresponding to the landing and to complete retraction, this nose, as seen in Fig. 5, presses against the pivot 2 and ensures the locking.

The locking can be improved still more by the arrangement illustrated in Fig. 2. In this example, in which the same parts and pivots are denoted by the same reference numbers as in Fig. 1, the device is perfected by a lever 11 mounted on the pivot $a$ and provided with an arm 2c secured to the branch 8 of the folding link and hinged around a pivot 16 at the end of the jack rod V. The two branches 7 and 8 show close to their hinge-point two shoulders 14 and 15, while the lever 11 shows a corresponding recess 13 which engages the shoulders 14 and 15 when the lever 11 bears against the folding rod 7—8 then at its maximum length. Furthermore, the lever 11 shows on its face directed towards the folding leg, a stop 12. Finally elastic means, such as a sandow 17, held between a point 21 that is fixed with reference to the aircraft and an extension of the arm 11, urges this arm towards the locking position under landing conditions as shown in full-drawn lines in Fig. 2. In the position of retraction of the gear, conditions may arise when the jack, that controls the dropping of the gear, may find itself unable to carry out its job by reason of the existence of leaks, or for any other reason, and this would lead to the risk of an incapacity of lowering the gear. The sandow 17, that is at this moment in position 17a (see position in dotted lines in Fig. 2) acts on the lever 11a so as to at first produce the unlocking, then the bending back of the folding link and finally the lowering of the gear, assisted in this last operation by the weight of the gear. The part 17 provides thus additional safety means.

The working of the device can be understood easily.

When a pull is made on the rod of the jack V, in the direction of the arrow F, the arm 11 starts by swinging round the pivot $a$, and unlocking the folding link 7—8. At this moment, the stop 12 bears on the arm 8, while the arm 11 has assumed a position 11c and initiates the rocking of the folding link and consequently the turning of the wheel-carrying leg A around its pivot 1. In this movement the point $a$ has taken successively the positions ranging from $a1$ to $a6$. The arms 7 and 8 assume positions 7a and 8a, in which they are locked by the arm 11 in its position 11a, while all these members have been through intermediary positions of which one is seen in 7b, 8b, 11b, the sandow arriving in its turn at position 17a after position 17b. It can be seen that the folding link is again locked positively in this end position, while the locking member acts at the same time for the transmission to the arm 8 of the force exerted by the jack V.

Obviously the shape of the locking device can be altered within large limits without widening unduly thereby the scope of the invention.

Furthermore a locking device of the type disclosed can be put into practice with a landing gear according to the invention whatever may be the position of the pivots used for securing to the aircraft the elastic leg and the end of the folding leg.

In Fig. 3 has been shown a form of execution in which the folding link is replaced by a rigid bar $e$ carrying a link $f$. The pivot 2, fixed in relation to the aircraft, engages this link, that offers furthermore at its upper end a part set back in relation to the longitudinal axis of the link. Thus it is clear that the triangle $a$, 2, 1 is stayed in the landing position shown in full drawn lines and for which the wheel-carrying leg assumes the position A1, its portion located between the pivotal connections to the aircraft at 1 and to the rod at $a$, assuming the position $d1$, and the bar the position $e1$, and it is similarly stayed in the retracted position, shown in dotted lines and for which the parts mentioned above assume the positions respectively shown at A6, $c6$, $e6$. In order to take in the leg, the jack rod 10 pulls on the curved end of the bar $e$ to which it is joined through the axis $b$ and then produces a torque round the pivot $a$ that has the effect of turning the bar $e1$ and bringing the pivot 2 in the rectilinear part of the link. From this moment onwards the action of the jack initiates a displacement of the link in respect to the pivot 2 and the turning of the leg A1$d1$ round its pivot 1. In $e4$ is seen an intermediary position of the bar $e$ during the retraction, with the link at this moment in the position $f4$, the pivot $a$ in the position $a4$ and the pivot $b$ in the position $b4$. At the end of the retraction run, the torque round the pivot 6 having as a lever arm the distance a6—b6, results in engaging again the pivot 2 in the curved part at the end of the link f6, thus ensuring the desired locking.

It is easy to understand that the same operations can be produced in an opposite direction when the gear is lowered, and the rod of the jack then exerts on the pivot b a thrust action.

In all the examples that have been described the side of the triangle with a varying length was formed by the locking member. However, as noted above, the device can be executed as well with a locking member of constant length, the side of the triangle with a varying length being formed in this case by the distance between the pivot connecting the wheel-carrying leg with the aircraft and the pivot connecting it with the locking member.

In Fig. 4 has been shown a form of execution illustrating such a device. In this example, the end of the wheel-carrying leg forms a link $h$ in which is engaged the pivot $a$. The rod of the jack is hinged to the locking member made up in this example of a rigid rod $g$ turning at a suitable point of its length on pivot $b$.

For the retraction, a start is made by drawing on the rod 10 of the jack that lowers the pivot $a$ inside the link $h$ as far as the central position of the arrangement that it reaches when the pivot is at the end of the link (see position $a4$, $d4$, $h4$). From this central position, the pivot $a$ climbs again the length of the link to arrive at its upper end where it assumes the position $a6$, while the rigid rod takes the position $g6$, the wheel-carrying leg the position $d6$, A6 and the link the position $h6$.

It will be readily understood that it is possible to design other forms of execution based on the same principle without widening the scope of the invention as defined in the accompanying claims.

What I claim is:

1. A landing gear for aircrafts comprising a wheel-carrying leg, a bent extension thereof at its upper end, a pivot on the aircraft body to which said extension is rockably secured, a locking member pivotally secured to the aircraft body and to a point on the main portion of the wheel-carrying leg, the pivotal connection of said locking member and of the extension with the aircraft body lying substantially along a vertical line, control means pivotally connecting a fixed point of the aircraft body to the locking member, the point of pivotal connection between the leg and the locking member forming with the two points of pivotal connection of the aircraft body with the leg and with the locking member respectively, a triangle adapted to assume two equal symmetrical configurations with reference to the line connecting the two last named points of pivotal connection and corresponding respectively to the landing and the retracted position of the wheel-carrying leg and means whereby the control means displace the point of pivotal connection between said leg and the locking member for making the above defined triangle move between its two configurations under conditions of varying length for one of the sides of said triangle leading to the first mentioned point of pivotal connection.

2. A landing gear for aircrafts comprising a wheel carrying leg pivotally secured to the aircraft body, a locking link shaped member pivotally secured to the wheel-carrying leg at a point thereof spaced with reference to the point of pivotal connection of said leg with the aircraft body, a pivot on the aircraft body slidingly engaging the link-shaped locking member an extension at the end of the locking member near the pivotal connection thereof with the wheel-carrying leg and control means connecting a fixed point of the aircraft body with said extension of the locking member, the point of pivotal connection between the locking member and the leg forming with the pivotal point of connection of the leg and with the pivot slidingly engaging the locking member a triangle adapted to assume two equal symmetrical configurations with reference to the line connecting the two last named points of pivotal connection and corresponding respectively to the landing and the retracted position of the wheel-carrying leg, and means whereby the control means displace the point of pivotal connection between said leg and the locking member for making the above defined triangle move between its two configurations under conditions of varying length for the operative portion of the link shaped locking member between its pivotal connections.

3. A landing gear for aircrafts comprising a wheel-carrying leg pivotally secured to the aircraft body, a locking link-shaped member pivotally secured to the wheel-carrying leg at a point thereof spaced with reference to the point of pivotal connection of said leg with the aircraft body, a pivot on the aircraft body slidingly engaging the link-shaped locking member, the link inside said member showing a set back portion at its end remote from the connection with the wheel-carrying leg, an extension at the end of the locking member near the pivotal connection thereof with the leg and control means connecting a fixed point of the aircraft body with said extension of the locking member, the point of pivotal connection between the locking member and the leg forming with the pivotal point of connection of the elastic leg and with the pivot slidingly engaging the locking member a triangle adapted to assume two equal symmetrical configurations with reference to the line connecting the two last named points of pivotal connection and corresponding respectively to the landing and the retracted position of the wheel-carrying leg, and means whereby the control means displace the point of pivotal connection between said leg and the locking member for making the above defined triangle move between its two configurations under conditions of varying length for the operative portion of the link-shaped member between its pivotal connections.

4. A retractable landing gear for aircraft comprising a wheel-carrying leg pivotally secured to the aircraft body at an intermediate point of its length and having a bent extension at its upper end, a locking member constituted by a toggle linkage pivotally connected at one end to the aircraft body and at the other end to said bent extension, said toggle linkage comprising a primary link and a secondary link pivotally interconnected end to end to form a knee joint, parts on the links engageable one with the other and arranged so as to determine the opposite limits of motion of said leg from its fully extended to its fully retracted positions and to lock said leg at either of said extreme positions, a locking arm adapted to pivot round the point of pivotal connection between said secondary link and the leg and terminating with a recessed part adapted to cap the said engageable parts in their interengaging position, a stop on said arm adapted to operatively engage said secondary link, an elastic control member connecting the locking arm to a point of the aircraft for holding said arm in the locking position corresponding to alignment between the said links maintaining the wheel carrying leg in its extended position and urging said arm into its releasing position when said links are aligned in the position corresponding to the retracted position of said leg, the point of pivotal connection between said leg and said toggle linkage forming with the two points of pivotal connection of the aircraft body with said leg and with said toggle linkage respectively, a triangle adapted to assume with said links in self locking alignment with one another two equal symmetrical configurations with reference to a line connecting the two last mentioned points of pivotal connection and corresponding respectively to said extreme positions of the wheel-carrying leg, and means connecting a fixed point of the aircraft body to said pivoting locking arm to apply a rotational moment to said locking arm about its said pivotal connection between said secondary link and said leg sufficient to swing said locking arm in its unlocking position and to displace said pivotal connection between said leg and said toggle linkage for making the above defined triangle move between its two configurations while shifting the said two links out of one position of alignment into the other.

RAYMOND SAULNIER.

REFERENCES CITED

The following references are of record in the file of this patent:

UNITED STATES PATENTS

| Number | Name | Date |
| --- | --- | --- |
| 2,278,910 | Bertran | Apr. 7, 1942 |
| 2,391,998 | Palmer | Jan. 1, 1946 |
| 2,405,651 | Height | Aug. 13, 1946 |

FOREIGN PATENTS

| Number | Country | Date |
| --- | --- | --- |
| 457,989 | Great Britain | Dec. 10, 1936 |
| 484,938 | Great Britain | May 12, 1938 |
| 539,625 | Great Britain | Sept. 18, 1941 |